United States Patent [19]
Cote

[11] Patent Number: 5,191,758
[45] Date of Patent: Mar. 9, 1993

[54] METHOD AND APPARATUS FOR NUT HARVESTING

[75] Inventor: Jean P. Cote, Prairie Lea, Tex.

[73] Assignee: Continental Wholesale Florists, Inc., San Antonio, Tex.

[21] Appl. No.: 757,695

[22] Filed: Sep. 11, 1991

[51] Int. Cl.⁵ .................. A01D 46/00; A01D 46/22; A01D 46/26
[52] U.S. Cl. ..................................... 56/329; 56/340.1
[58] Field of Search ..................... 56/340.1, 328.1, 329

[56] References Cited

U.S. PATENT DOCUMENTS

| | | | |
|---|---|---|---|
| 3,105,346 | 10/1963 | Stanclift. | |
| 3,105,347 | 10/1963 | Anderson et al. | |
| 3,338,041 | 8/1967 | Arpin. | |
| 3,440,809 | 4/1969 | Maxwell. | |
| 3,460,331 | 8/1969 | Galis. | |
| 3,505,801 | 4/1970 | Nye. | |
| 3,511,039 | 5/1970 | Gould et al. | |
| 3,596,455 | 8/1971 | Adrian | 56/340.1 |
| 3,623,308 | 11/1971 | Nye | 56/340.1 |
| 4,269,021 | 5/1981 | Friday. | |
| 4,320,618 | 3/1982 | Dandl | 56/340.1 |
| 4,545,187 | 10/1985 | Landgraf | 56/340.1 X |

*Primary Examiner*—Stephen J. Novosad
*Attorney, Agent, or Firm*—Gunn, Lee & Miller

[57] ABSTRACT

A harvester for nut-bearing trees comprising a self-propelled chassis having a forwardly projecting, vertically shiftable frame carrying a tree-shaking mechanism and a flexible fabric canopy foldable from a generally transverse, transport position relative to the chassis to an inverted cone-shaped configuration surrounding the trunk and lower limbs of a tree. A portion of the cone-shaped configuration is defined by a rigid vertically inclined wall having windows for the operator to view the tree being approached and the interior of the canopy during the tree-shaking operation. Nuts, hulls and trash shaken from the tree into the canopy are carried by conveyors through a trash-separating zone and then through a dehuller. The separated nuts are then sized and bagged according to size by mechanisms mounted on the self-propelled chassis.

45 Claims, 9 Drawing Sheets

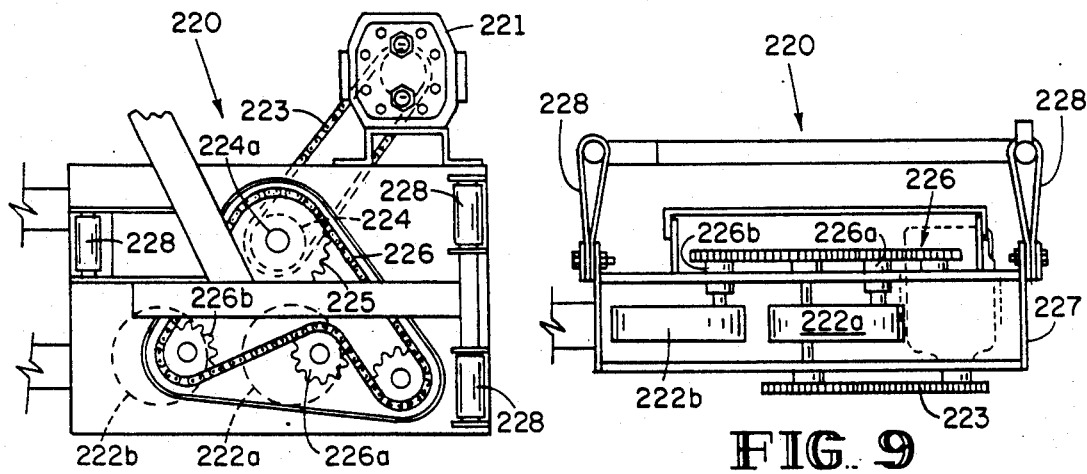
FIG. 8
FIG. 9
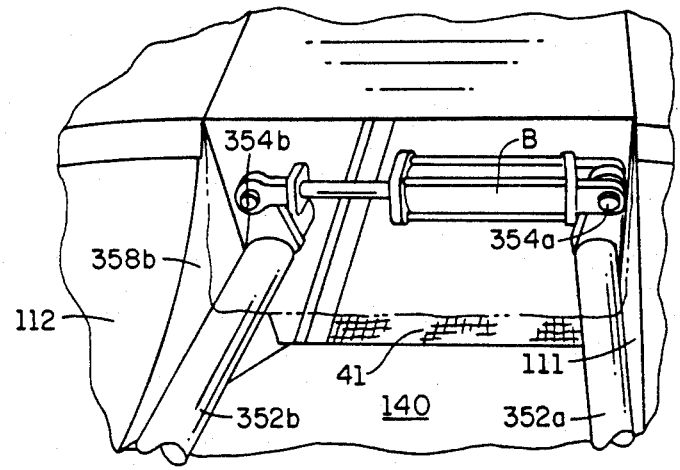
FIG. 10
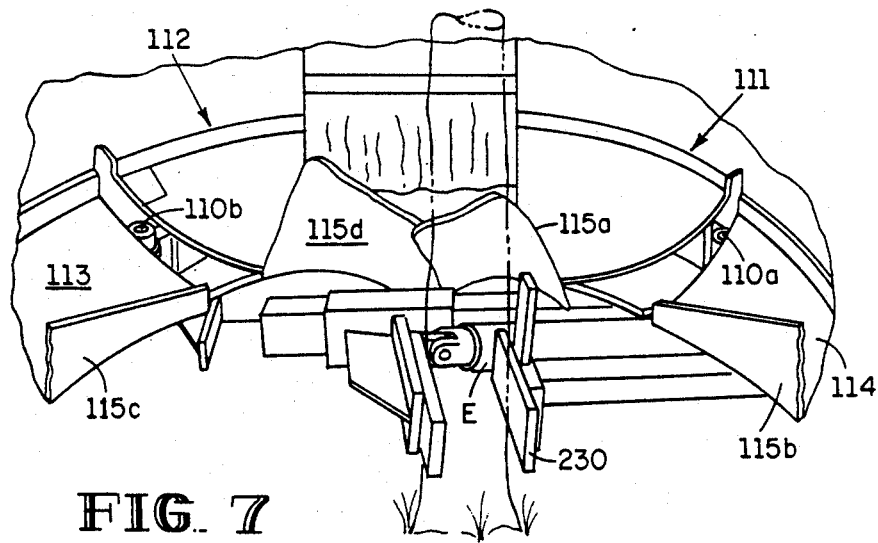
FIG. 7

METHOD AND APPARATUS FOR NUT HARVESTING

BACKGROUND OF THE INVENTION

1. Field of the Invention

This invention relates to a method and apparatus for harvesting nuts from trees, and particularly a unitary, self-propelled nut harvester that will efficiently remove and collect nuts from a tree, separate trash from the collected nuts, divide the collected nuts according to size, and bag the sized nuts.

2. Summary of the Prior Art

Apparatuses for the removal and collection of ripened nuts from trees have been the subject of many inventive efforts. Early on, it was realized that if the nut-bearing tree could be mechanically shaken by vibrational forces applied to its trunk, the ripened nuts, with or without their hulls, could be dislodged and fall. Such vibrational devices were soon mounted on self-propelled vehicles which could be successively driven up to each nut-bearing tree.

Next cam the development of catching apparatuses for the falling nuts. One form of such apparatus comprised an inverted cone-shaped sheet of canvas or any similar wear-resistant, flexible sheet material mounted on an articulated frame structure which would support the canvas in an inverted semi-conical configuration as the machine approached the tree trunk and then the frame structure would be arcuately expanded so that the bottom of the inverted canvas cone was positioned around the trunk of the tree while the upper, large-diameter portion of the inverted canvas cone was spread out to underlie substantially all of the nut-carrying branches of the tree. See, for example, U.S. Pat. Nos. 3,105,346, 3,105,347, 3,338,041, and 3,440,809.

When the tree trunk is mechanically vibrated in a horizontal plane, the dislodged nuts fall onto the inverted canvas cone and are directed by gravity to the lower end of the cone where they fall onto a conveyor which carries the collected nuts, hulls, and other trash dislodged from the tree by the shaking action to a collection bin mounted on the chassis. See, for example, U.S. Pat. Nos. 3,105,346 and 3,105,347.

Other prior art used the inverted canopy to catch and hold the nuts, hulls and trash that fell from the tree until they could be deposited into a truck for offsite sorting and bagging. See, for example, U.S. Pat. Nos. 3,440,809 and 3,338,041.

A common problem of the aforementioned prior art disclosures is that the volume of hulls and trash far exceeds the volume of the nuts collected and rapidly fills the collection bin or the canopy of the nut-harvesting machine. This requires frequent trips to a truck to haul the collected materials to a nut-processing plant where the nuts are dehulled and the hulls and other trash are removed and disposed of. Additionally, sizing and bagging operations have to be performed before the nuts can be marketed.

Another problem is the accurate positioning and maneuverability of the chassis carrying the canopy and shaking apparatus. Such canopies are of substantial width and height even when folded. In most instances, two persons are needed to accurately position and secure the canopy around the tree.

Obviously, there is a need for a self-propelled nut-harvester that can be conveniently operated by one man to collect nuts, hulls and accompanying trash dislodged from the tree, separate the hulls and trash from the nuts, size the trash-free nuts, and bag the sized nuts in the orchard, while returning the empty hulls and trash to the ground as a desirable mulch.

SUMMARY OF THE INVENTION

The principal object of this invention is to provide a harvesting method and apparatus for tree-grown nuts that will eliminate the above enumerated disadvantages of existing harvesting apparatus and allow for the nuts to be dehulled, sized and bagged before being removed from the orchard.

A nut harvester embodying this invention comprises a self-propelled machine that can readily move through a grove of nut-bearing trees. Self-propulsion is economically obtained by building the harvester on a truck or combine chassis which is equipped with power take-off shafts by which various assemblages of the nut harvester may be driven.

An elevated operator's station is provided on what will be referred to as the forward end of the self-propelled chassis. Projecting forwardly from the forward end of the self-propelled chassis, and positioned at a height equal to the ground clearance of the self-propelled chassis, is a rearwardly and upwardly extending conveyor that will carry all nuts, hulls and other trash dislodged from the tree toward the self-propelled chassis. Immediately above the input end of the conveyor a foldable canopy is mounted on a frame attached to the self-propelled chassis and is capable of assuming an inverted cone-shaped configuration surrounding the tree and its lower branches. The canopy has a vertically inclined, stationary rear rigid wall portion having windows adjacent the operator's station which allow the operator to observe the tree during approach to the harvesting operation. The canopy has a discharge opening above the input end of the conveyor and air jets direct the nuts, hulls and trash into such opening. The shaking mechanism grasps the tree immediately forward the input end of the conveyor.

A vacuum system such as a fan separates the hulls and trash from the nuts on the conveyor belt. The hulls and trash are expelled through a debris exhaust vent positioned on the lower mid-portion of the chassis. The nuts remaining on the conveyor are deposited in a collection bin located beneath the operator's station.

A second conveyor extends rearwardly and upwardly from the collection bin to the dehuller. After the nuts are dehulled, the nuts and hulls fall onto a third conveyor that transports them to a chute that runs rearwardly and downwardly through the blower. Combined, the aforementioned third conveyor and blower are a means for separating the nuts from the empty hulls and broken or lighter nuts. The hulls are expelled through a second debris exhaust vent located behind the operator's station. The broken and lighter nuts ar separated from the hulls being expelled through the second debris exhaust vent by the amount of air discharged from the blower. The broken or lighter nuts drop through doors in the bottom of the debris exhaust vent into bags. The bags are tied and ready for market.

The heavier whole nuts continue to drop through the chute to the input end of a fourth conveyor positioned beneath the chute. The fourth conveyor extends rearwardly and horizontally on the rearward end of the self-propelled chassis at a height comfortable for persons to stand about and visually inspect the nuts.

An auger mechanism is positioned at the output end of the fourth conveyor. The auger carries the nuts to the sizing mechanism which is positioned above the fourth conveyor. The sizing mechanism is conventional and known in the industry. As the nuts progress through the sizing mechanism, they drop through holes that match the size of the nut and are dropped into different bags according to their size. The bags are tied and ready for market.

The foldable canopy is defined by a plurality of pivotally movable conical segments. In the harvesting position, the conical segments form an inverted cone shape to surround the trunk and lower limbs of the tree. The conical segments are divided into two sets. Each set is comprised of a rear and forward conical segment. The forward conical segments are pivotally attached to the rear conical segments for opening and closing of the foldable canopy. When the forward conical segments are in their open position, both sets of conical segments can be pivoted about horizontal axes parallel to the path of the chassis to cause the top portion of the foldable canopy to pivot towards the nut harvester in a direction parallel to the path of the self-propelled chassis. This provides greater clearance and causes the nut harvester to be more compact for maneuvering ease throughout the nut grove. The bottom portion of the foldable canopy is made of a rigid material. Rigid fabric support arms are pivotally attached to the rigid bottom section of the canopy for movement about a generally vertical axis. A foldable wear-resistant material covers the fabric arms.

The forward rigid bottom sections of the foldable canopy are double-walled to create an air pressure chamber. The inner wall defines nozzles directed toward the rear rigid bottom sections through which pressured air flows. The pressured air causes the nuts, hulls and trash toward the aforementioned discharge opening in the canopy to fall onto the input end of the conveyor belt positioned underneath the aforementioned opening.

The shaker comprises a pair of eccentrically mounted weights that rotate about horizontally spaced vertical axes to impart a transverse vibrational movement to the trunk of the tree being harvested. The entire shaking mechanism is supported on the same frame that supports the foldable canopy and is positioned beneath the rigid bottom section of the foldable canopy.

The frame that supports the foldable canopy and the shaking mechanism is movable vertically relative to the chassis for increased ground clearance during transport and increased limb clearance during the harvesting operation.

Further objects and advantages of the invention will be apparent to those skilled in the art from the following detailed description of a preferred embodiment, taken in conjunction with the annexed sheets of drawings.

BRIEF DESCRIPTION OF THE DRAWINGS

FIG. 7 is an enlarged fragmentary perspective view of the tree-grasping arms of the shaker mechanism.

FIG. 8 is an enlarged top view of the shaker drive mechanism with frame parts omitted for clarity.

FIG. 9 is an enlarged side view of FIG. 8.

FIG. 10 is an enlarged perspective view of the cylinder that moves the conical segments into the transport position and the forward end of the first conveyor.

DETAILED DESCRIPTION OF THE PREFERRED EMBODIMENT

Figure 1:
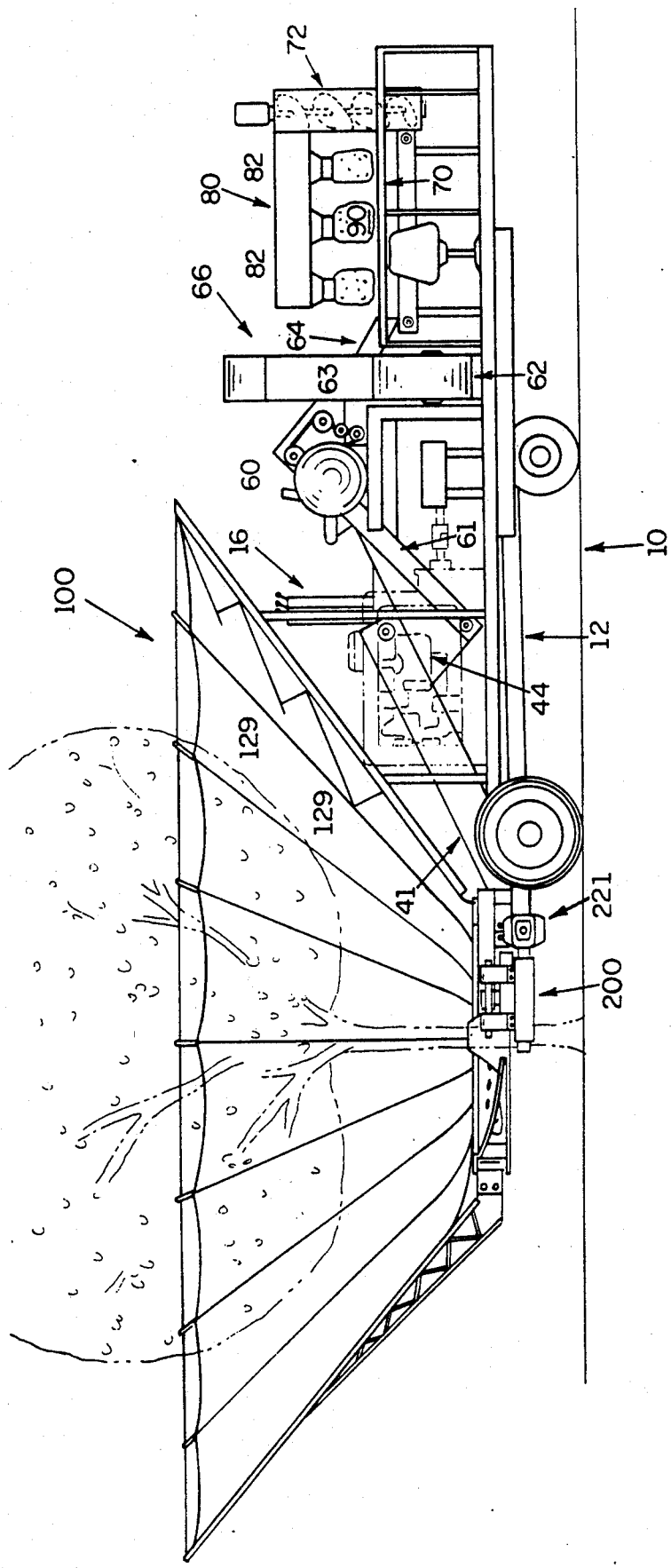
FIG. 1 is a side elevational view of the nut harvester disposed in harvesting relation to a nut tree.
Figure 2:
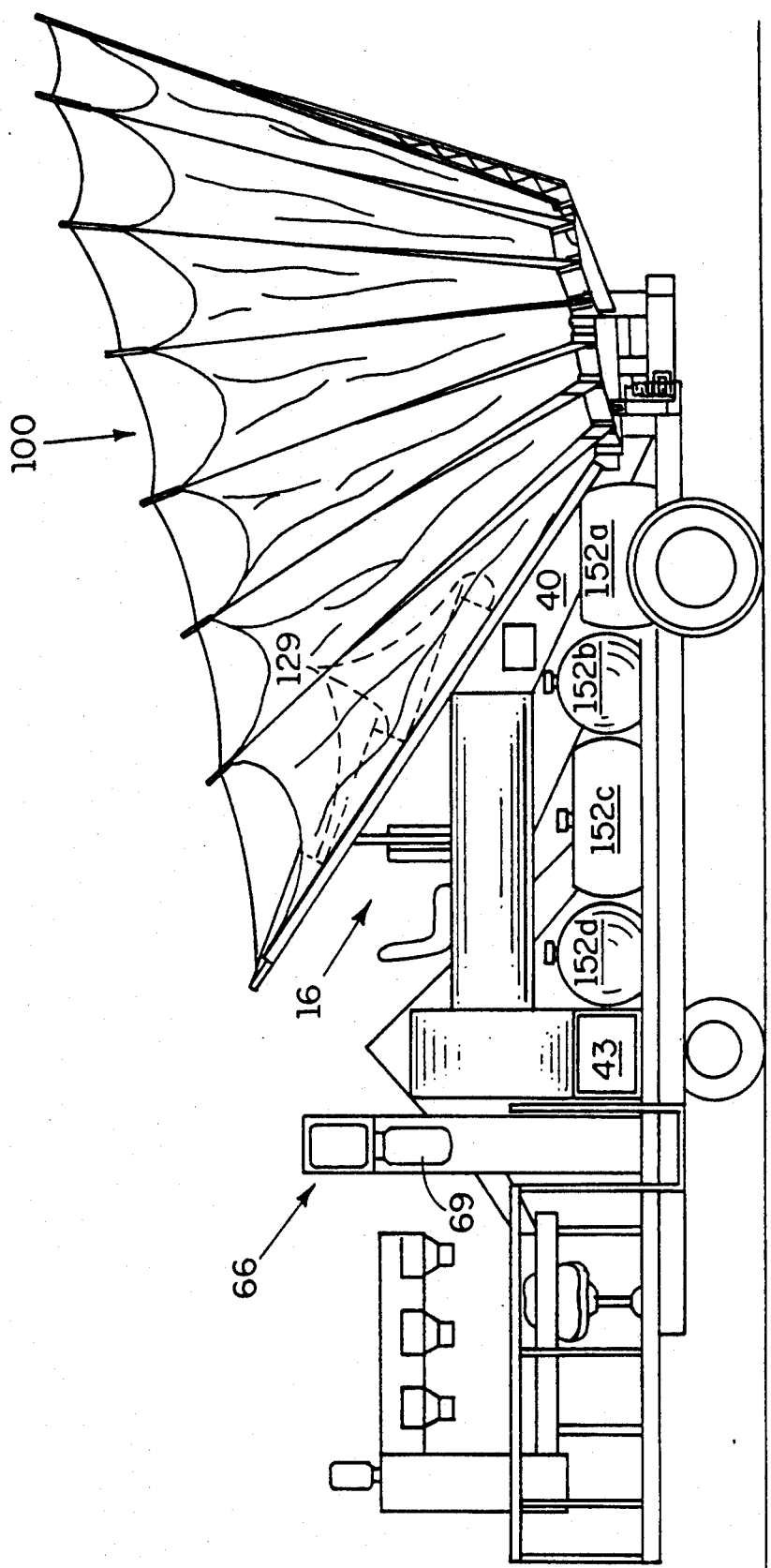
FIG. 2 is a side elevational view of the nut harvester disposed in the transport position.
Figure 6:
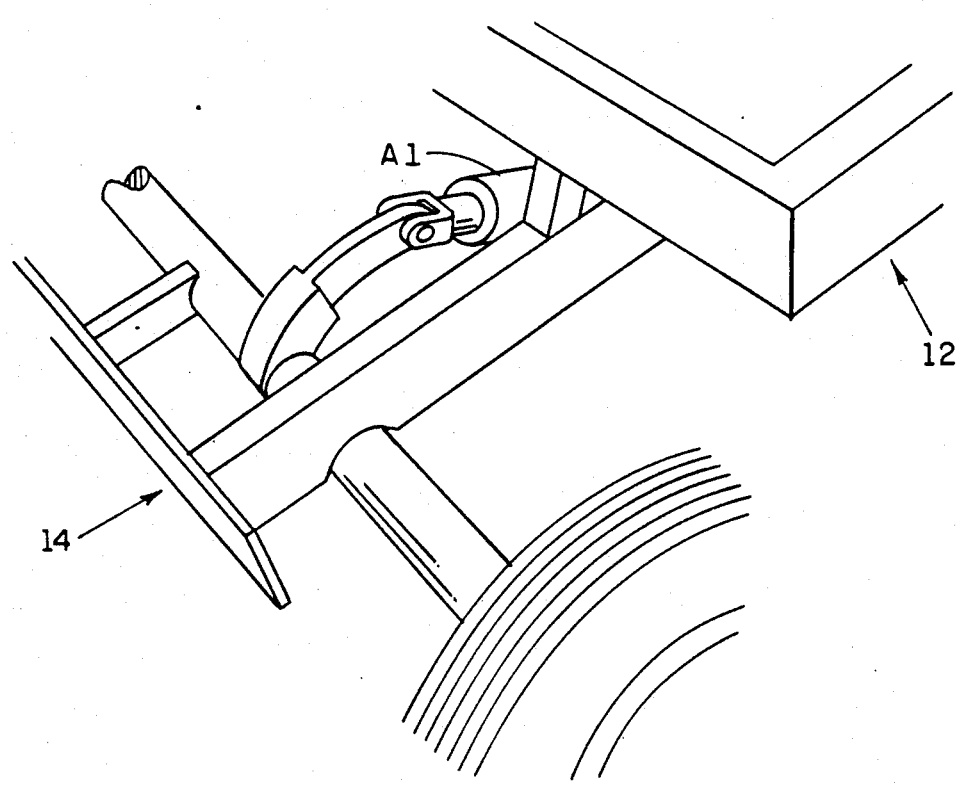
FIG. 6 is an enlarged fragmentary perspective view of the mechanism that raises and lowers the frame that supports the foldable canopy and the shaking mechanism.

Referring to FIGS. 1, 2 and 6, the nut harvester generally designated 10 includes a foldable canopy 100 and shaking mechanism 200 supported by a vertically movable frame 14 attached to the forward end of the self-propelled chassis 12. An elevated operator's station 16 is positioned behind the foldable canopy 100 on the self-propelled chassis 12 to allow one person to drive and position the nut harvester 10 for harvesting. A first conveyor 41 is mounted on the self-propelled chassis 12 of the nut harvester 10 to remove nuts and trash from the foldable canopy 100, as is a vacuum system 40 for separating the trash from the harvested nuts on the first conveyor 41, a dehuller 60, a blower 62 for separating the hulls and broken nuts from the dehulled whole nuts, a sizing mechanism 80, and a bagging mechanism 90.

Figure 4:
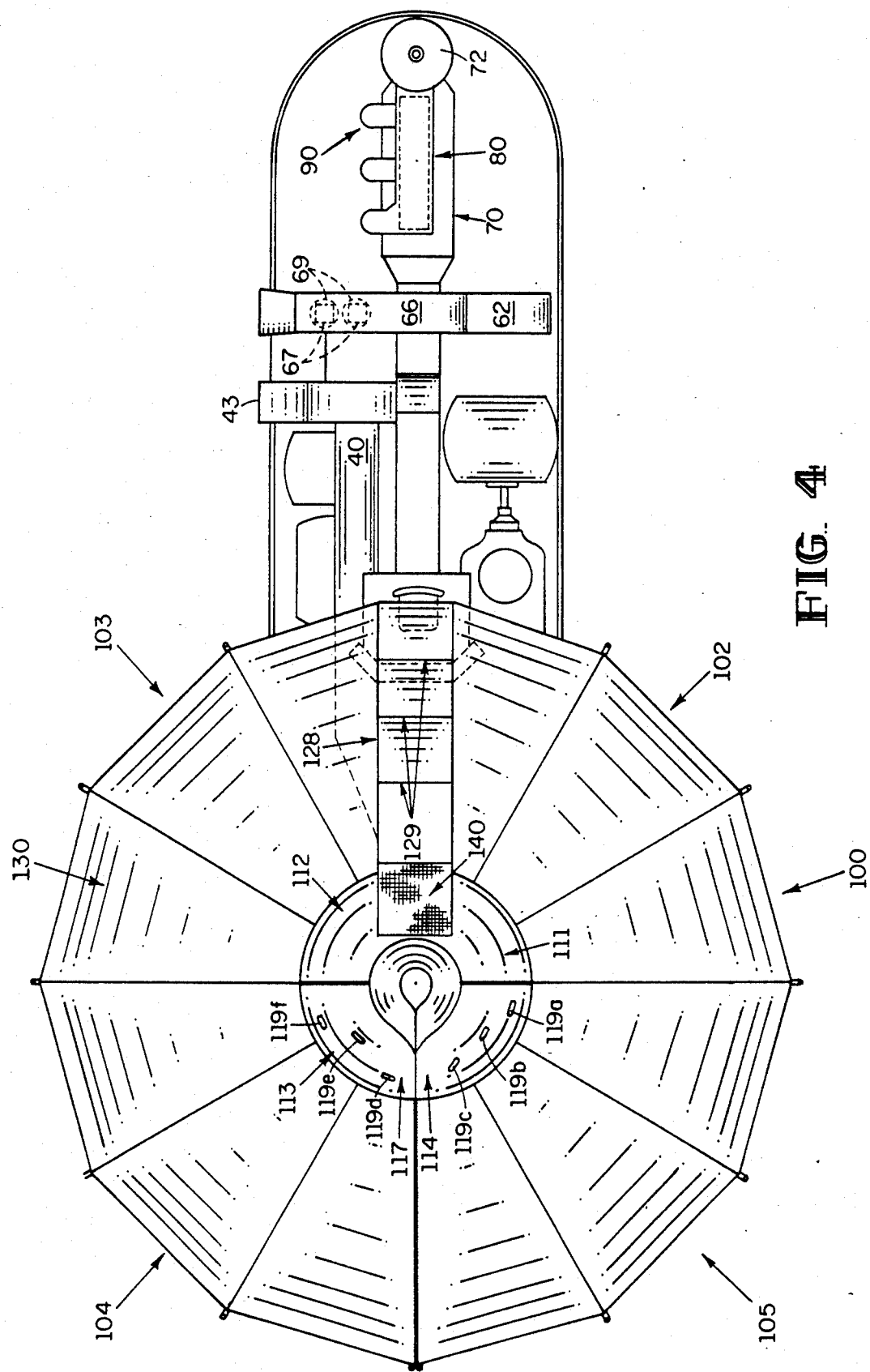
FIG. 4 is a top view of the nut harvester with the canopy in the harvesting position.
Figure 5:
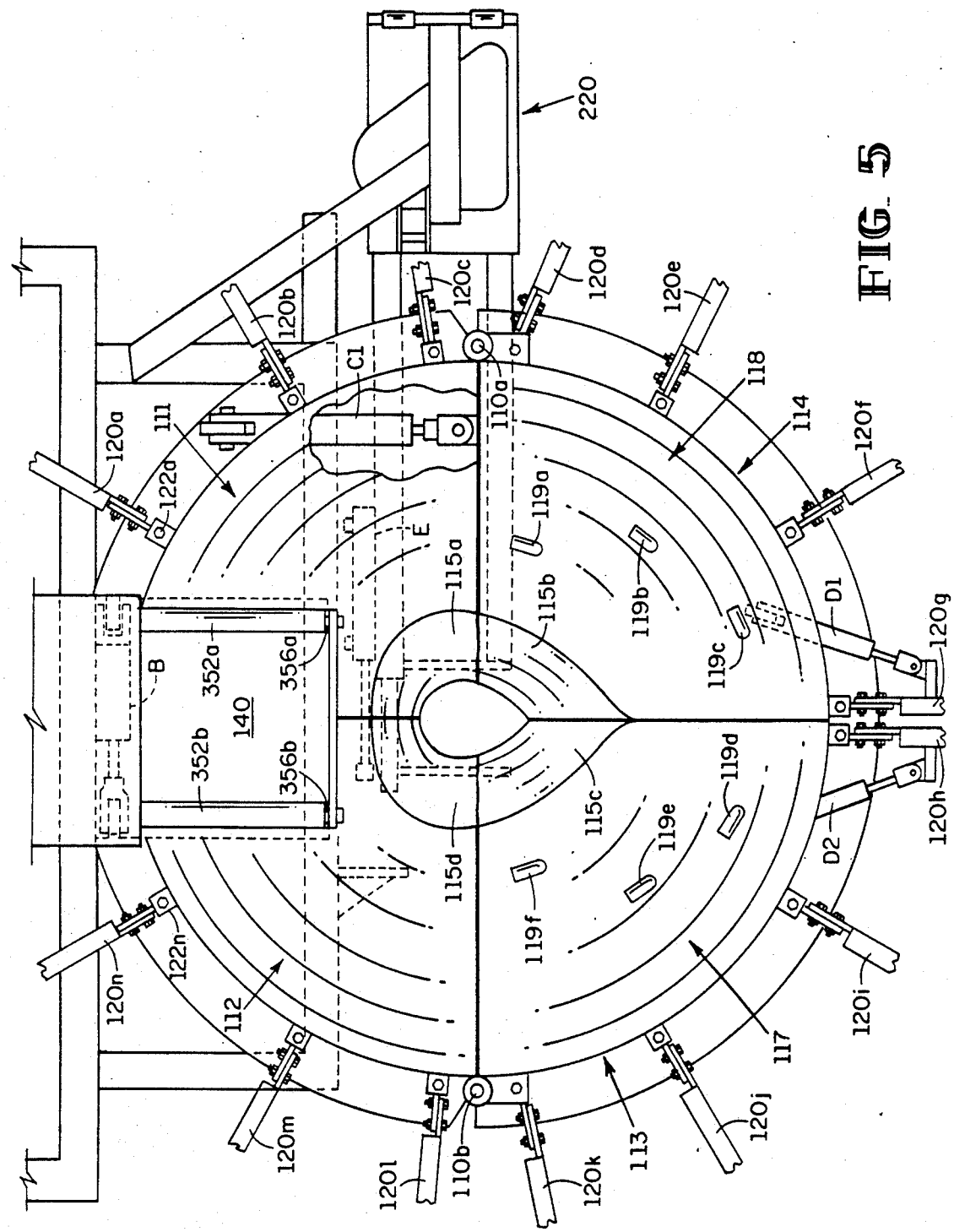
FIG. 5 is an enlarged top view of the rigid bottom sections and the shaking mechanism.
Figure 14:
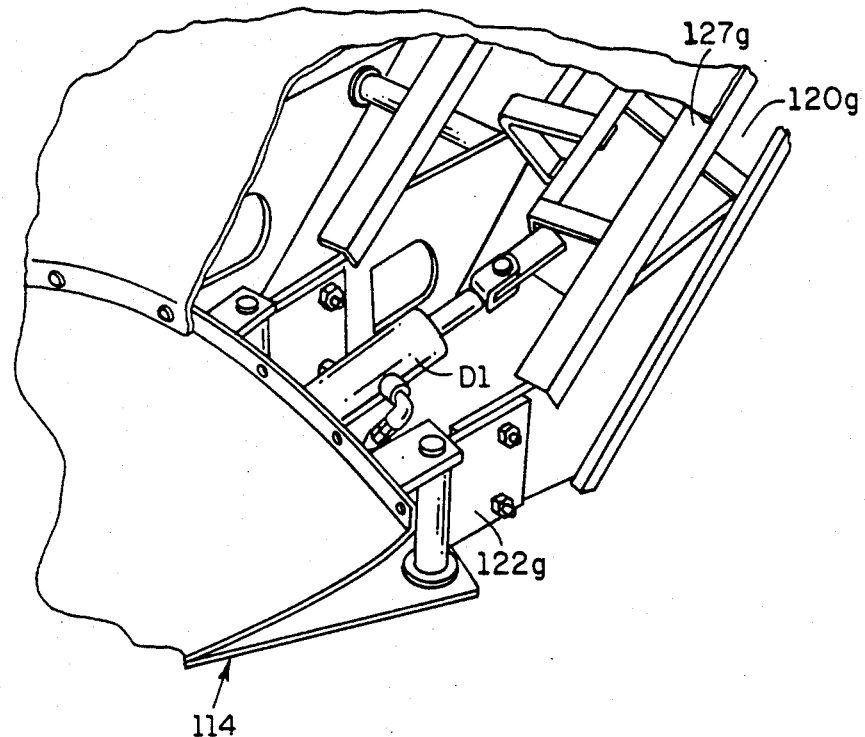
FIG. 14 is an enlarged perspective view of the cylinder that moves the fabric support arms.

Referring to FIGS. 4 and 5, the foldable canopy 100 comprises a plurality of conical segments 102–105. Conical segments 102–105 respectively have rigid bottom sections 111–114 on which vertical axis hinges 122a–122n are attached. Rigid fabric support arms 120a–120n, having a truss-shaped configuration (see FIGS. 11 and 14), are bolted to hinges 122a–122n to allow removal of the rigid fabric support arms 120a–120n for storage. The rear portion of the foldable canopy 100 is located directly forward of the elevated operator's station 16 and comprises a vertically inclined, stationary wall portion 128 with viewing windows 129 located at convenient positions for the operator to look through while in the elevated operator's station 16 and the foldable canopy 100 is in the folded transport position or when the foldable canopy 100 encircles a tree in the harvesting position. A foldable, wear-resistant, flexible material 130, such as canvas, is removably secured to the top sides 127a–127n of the rigid fabric support arms 120a–120n (see FIG. 11) and to the edges of the vertically inclined, stationary wall portion 128 of the foldable canopy 100.

The foldable canopy 100 is divided into two rear conical segments 102, 103 and two forward conical segments 104, 105 and a vertically inclined, stationary wall portion 128. For ease of description, the conical segments 102-105 can be divided into two sets. One set is comprised of rear conical segment 102 which is pivotally connected to forward conical segments 105 by pin 110a and the other set is comprised of rear conical segment 103 which is pivotally connected to forward conical segments 104 by pin 110b.

In the harvesting position (see FIG. 1), the conical segments 102-105 and vertically inclined, stationary wall portion 128 define an inverted cone shape around the tree for catching of the nuts during harvesting. To assure non-abrasive contact with the tree trunk but to also assure that no nuts drop out of the foldable canopy 100, rubber pieces 115a-115d are suitably attached to the rigid bottom sections 111-114 nearest the tree (see FIG. 5).

Figure 11:
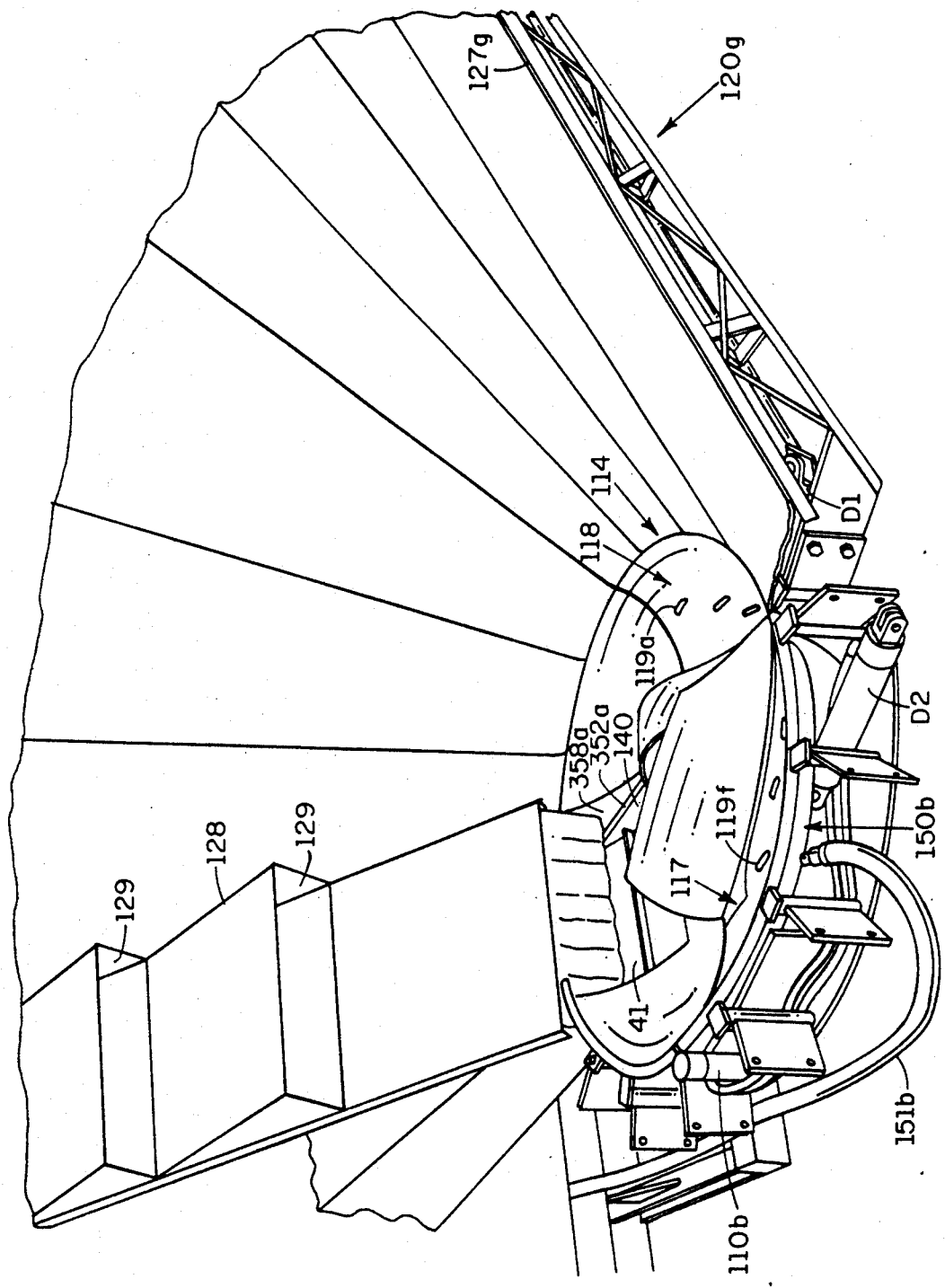
FIG. 11 is an enlarged perspective view of the canopy with one set of fabric support arms removed.

Referring to FIG. 5, the rigid bottom sections 111, 112 of rear conical segments 102, 103 define a discharge opening 140 for discharging the nuts, hulls and trash that are shaken from the tree into the foldable canopy 100 onto the input end of a first conveyor 41 located beneath the discharge opening 140 (see FIGS. 10 and 11). Nuts, hulls and trash that do not directly fall into the discharge opening 140 are forced to the discharge opening 140 and onto the input end of the first conveyor 41 by jets of pressurized air. As seen in FIG. 11, the forward rigid bottom sections 113, 114 are double-walled to form air pressure chambers 150b, of which only one is shown. The inner walls 117, 118 of the forward rigid bottom sections 113, 114 define nozzles 119a-119f through which the pressurized air is forced. The pressurized air causes the nuts, hulls and trash to exit through the discharge opening 140. The air is fed into the air pressure chambers via hoses 151b, of which only one is shown (see FIG. 11) attached to one of the pressurized air tanks 152a-152d (see FIG. 2) mounted on the self-propelled chassis 12.

After being discharged onto the first conveyor 41, the trash and empty hulls are separated from the hulled nuts by vacuum system 40, such as the input side of a fan or blower, and deposited on the ground through the first debris exhaust vent 43 (see FIG. 2). The remaining nuts on the first conveyor 41 are carried rearwardly and upwardly and deposited in the collection bin 44 (see FIG. 1).

Referring to FIG. 1, the forward end of a second conveyor 61 is positioned inside the collection bin 44. The second conveyor 61 carries the nuts rearwardly and upwardly to the dehuller 60. After the nuts are dehulled, a third conveyor 63 transports the hulls and nuts to a chute 64 that runs rearwardly and downwardly through a blower 62. Combined, the aforementioned conveyor and blower are a means for separating the whole nuts from the empty hulls and broken and lighter nuts. The hulls and nuts pass across blower 62 which causes the hulls and broken and lighter nuts to be separated from the heavier whole nuts. The whole nuts continue through chute 64 and drop onto the input end of a fourth conveyor 70. The hulls are blown out of the second debris exhaust vent 66 onto the ground (see FIG. 2). Referring to FIGS. 2 and 4, the broken or lighter nuts fall through doors 67 in the mid-portion of the second debris exhaust vent 66. Bags 69 are suitably attached to the doors 67 to catch the falling broken and lighter nuts (see FIGS. 2 and 4).

Referring again to FIG. 1, a fourth conveyor 70 is mounted on the self-propelled chassis 12 at a position to allow for visual inspection of the nuts as they travel across the fourth conveyor 70. An auger mechanism 72 is positioned at the output end of the fourth conveyor 70 to carry the whole nuts upwardly to the sizing mechanism 80. The sizing mechanism 80 sorts the nuts into at least three sizes. As the nuts are sized, they fall through the respective sized openings 82 in the sizing mechanism 80. A bagging mechanism 90 is suitably attached to the sizing mechanism 80 to catch the nuts falling through the sized openings 82.

The shaking mechanism 200 causes the nuts, hulls and trash to be shaken from the tree into the foldable canopy 100. As shown in FIG. 1, the shaking mechanism 200 is positioned below the foldable canopy 100. The shaking mechanism 200 comprises a housing or subframe 227 suspended from the frame 14 by straps 228 (see FIG. 9) for horizontal movement transverse to the path of the self-propelled chassis 12. The subframe 227 mounts a shaker drive mechanism 220 (see FIGS. 8 and 9) and tree-grasping arms 230 (see FIG. 7). Referring to FIG. 8, a hydraulic motor 221 runs the shaker drive mechanism 220. The motor 221 drives a chain 223 to turn a sprocket 224 that is keyed to a shaft 224a. Shaft 224a drives a second sprocket 225 to drive a second chain 226, which drives sprockets 226a and 226b. Sprockets 226a and 226b respectively rotate eccentrically mounted weights 222a and 222b (see FIG. 9 as well), which in turn cause the housing or subframe 227 that encases the shaker drive mechanism 220 to be vibrated horizontally. Tree-grasping arms 230 (see FIG. 7) are shiftably attached to the housing 227 and hence are also vibrated horizontally. This horizontal vibration causes the tree to be shaken when the tree-grasping arms 230 are in the harvesting position engaging the trunk.

Figure 3B:
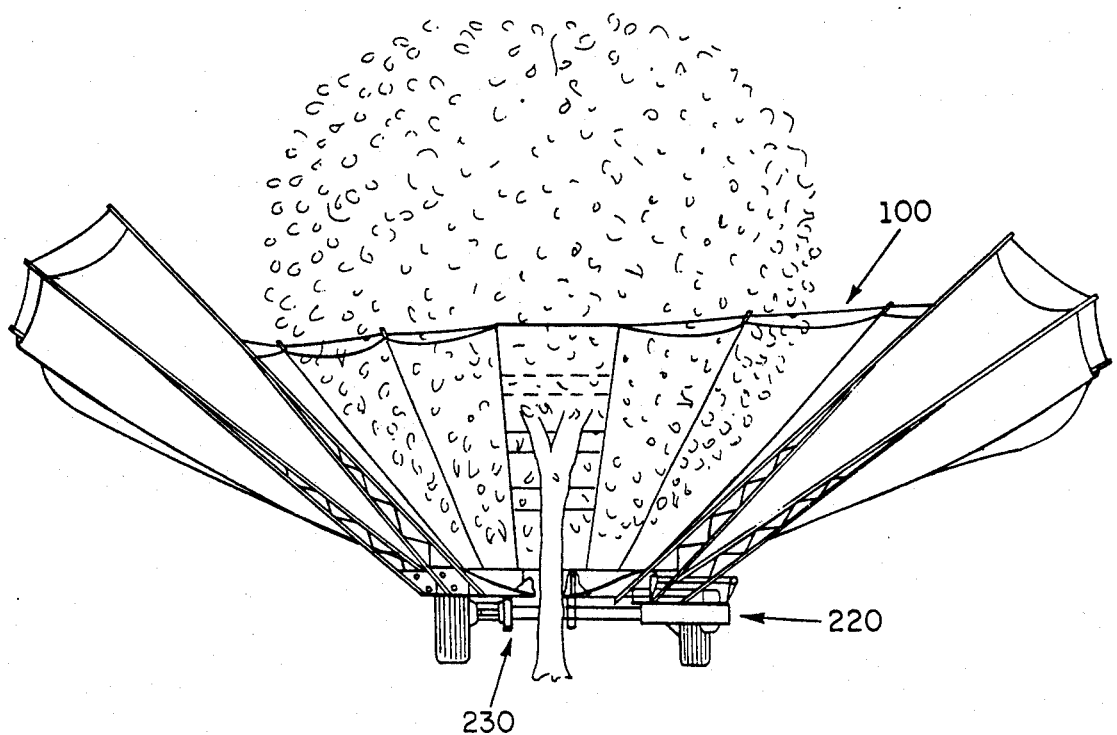
FIG. 3B is a frontal elevational view of the foldable canopy positioned to move beneath the branches of a tree to be harvested.

The final subject area to be described is an overall description of the harvesting operation. This will include a description of the positioning of nut harvester 10 for harvesting a tree (see FIGS. 1 and 3B), the harvesting procedure, and the positioning of the nut harvester 10 for transport (see FIGS. 2 and 3A). For ease of description, the nut harvester 10 will initially be described in the transport position, approaching a tree, then it will assume its harvesting position, the harvesting procedure will be described, and then the nut harvester 10 will be returned to the transport position.

Figure 3A:
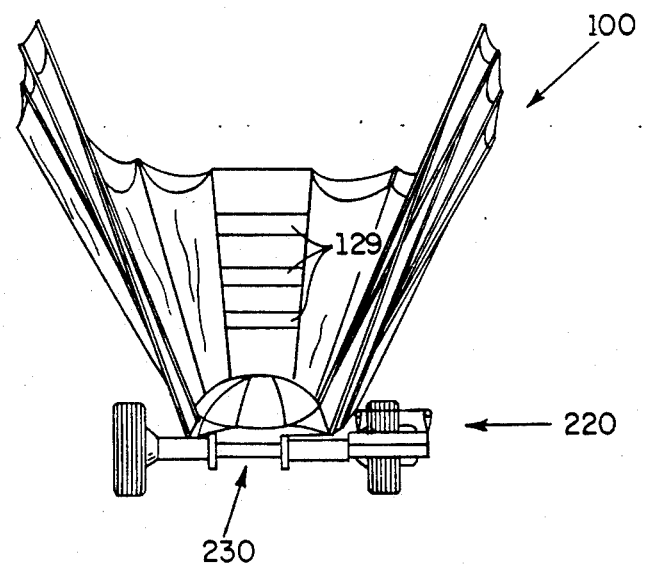
FIG. 3A is a frontal elevational view of the foldable canopy in the transport position.
Figure 13:
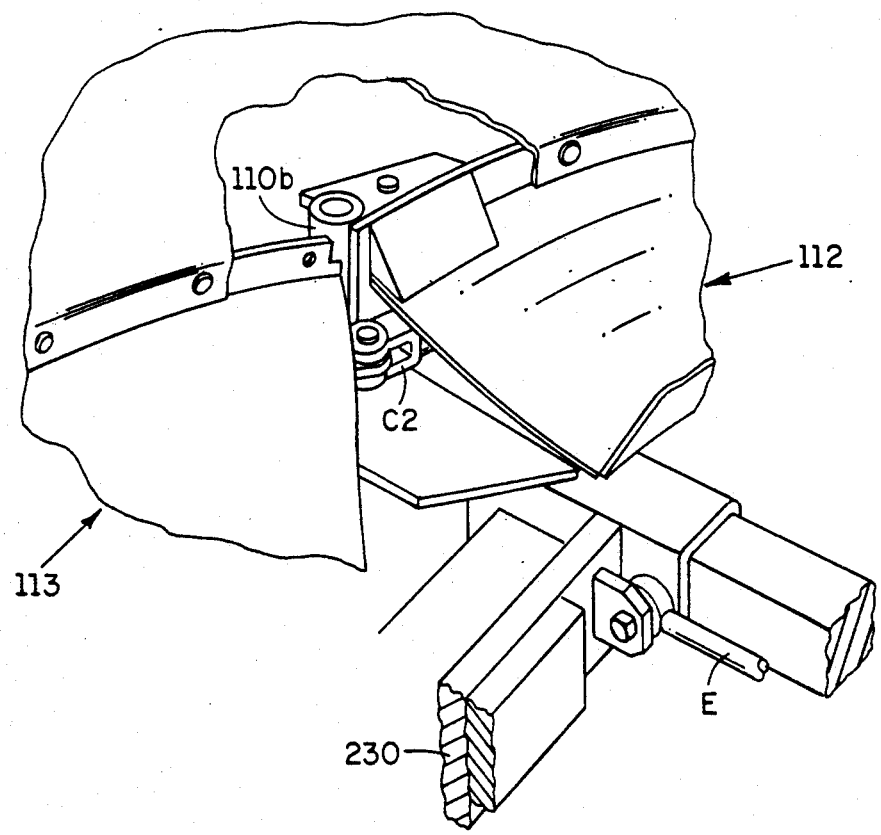
FIG. 13 is an enlarged perspective view of the pin and hydraulic cylinder for the vertical pivoting motion of the forward conical segments.

In the transport position (see FIGS. 2 and 3A.), the foldable canopy 100 is in an open position and is disposed in a generally transverse position relative to the self-propelled chassis 12. As the nut harvester 10 approaches the tree to be harvested, the frame 14 (see FIG. 6) that supports the foldable canopy 100 and the shaker mechanism 200 is lowered by hydraulic cylinders A1 and A2 to a position that assures that the rigid bottom sections 111-114 and the outer ends of the conical segments 102-105 of the foldable canopy 100 clear the lower limbs of the tree to be harvested. Referring to FIG. 10, hydraulic cylinder B lowers the outer portions of each set of conical segments 102-105 for increased branch clearance. Cylinder B is suspended between two pulling points, 354a and 354b. Pulling points 354a and 354b are attached to bushings 352a and 352b respectively by brackets 358a and 358b. (See FIGS. 10 and 11.) Bushings 352a and 352b surround shafts 356a and 356b as shown in FIG. 5. Bushings 352a and 352b are attached to the side of rigid bottom sections 111 and 112. (See FIG. 10.) As cylinder B is contracted, the bushings 352a and 352b are rotated about shafts 356a and 356b which cause the edge of the rigid bottom sections 111 and 112 connected to bushings 352a and 352b to move in a downward direction which effectuates an upward movement of the upper portion of the conical segments 102–105. When cylinder B is expanded, bushings 352a and 352b rotate in the reverse direction around shafts 356a and 356b causing a downward movement of the upper portion of the conical segments 102–105. In the transport position as shown in FIGS. 2 and 3A, cylinder B is in the contracted position. Cylinder B is expanded as the harvester approaches the tree to allow clearance of the lower limbs of the tree to be harvested. After the outer portions of each set of conical segments 102–105 are lowered, the nut harvester 10 is positioned so that the rubber pieces 115a and 115d attached to the rigid bottom sections 111 and 112 abut the tree (see FIGS. 3B and 7). Hydraulic cylinder E (see FIG. 7) causes the tree-grasping arms 230 to engage the tree trunk. As shown in FIGS. 4 and 5, and 13, hydraulic cylinders C1-C2 pivot the forward conical segments 104, 105 horizontally about pin 110a, 110b to encircle the tree. Hydraulic cylinders D1 and D2 complete the closure of the conical segments 102–105 to form an inverted cone shape by forcing the two forwardmost rigid support arms 120h, 120g into abutment. The closing of the two forward-most support arms 120g, 120h causes the wear-resistant flexible material 130 to be pulled taut which in turn causes the other fabric support arms 120a–120n to be pulled into the harvesting position. The harvesting operation can then be initiated by energizing hydraulic motor 121.

As the harvester 10 approaches a tree, and during the shaking of the tree, the operator has a clear view of the tree through the viewing windows 129 in the vertically inclined, stationary wall portion 128 of the foldable canopy 100. Hence excessive shaking which produces dislodgement of green nuts can be prevented by the operator.

All material dislodged from the tree by the shaking action falls into the inverted cone-shaped foldable canopy 100 and is directed by the air jets issuing from nozzles 119a–119f (see FIG. 5) into the discharge opening 140 formed by the rear rigid bottom sections 111, 112 of foldable canopy 100 and onto the input end of conveyor 41 (see FIG. 10). The flow of air along conveyor 41 produced by the vacuum system 40 effects a separation of empty hulls and other lightweight trash which is discharged through first debris exhaust vent 43 onto the ground to form a mulch (see FIG. 1).

As shown in FIG. 1, the nuts and hulls containing nuts are moved by conveyor 41 into collection bin 44. The second conveyor 61 moves the nuts and hulls containing nuts into the input end of the dehuller 60 where the nuts are removed from the hulls and dropped onto the input end of a third conveyor 63 which carries the nuts to a chute 64 that runs rearwardly and downwardly through the blower 62. The empty hulls are discharged through the second debris exhaust vent onto the ground by blower 62. The aforementioned third conveyor and blower combined is a means for separating the whole nuts from the empty hulls. The whole nuts drop from the output end of the chute 64 onto the input end of the fourth conveyor 70. The nuts are then sized by the sizing mechanism 80 and then bagged according to size by bagging mechanism 90.

While not specifically described, the motive power for the aforementioned conveyors, blowers, dehuller, sizing and bagging apparatus may be conventionally provided by hydraulic motors powered by pressured air generated by one or more air pumps (not shown) driven by power take-off shafts on chassis 10 and stored in the pressure tanks 152a–152d (see FIG. 2).

Figure 12:
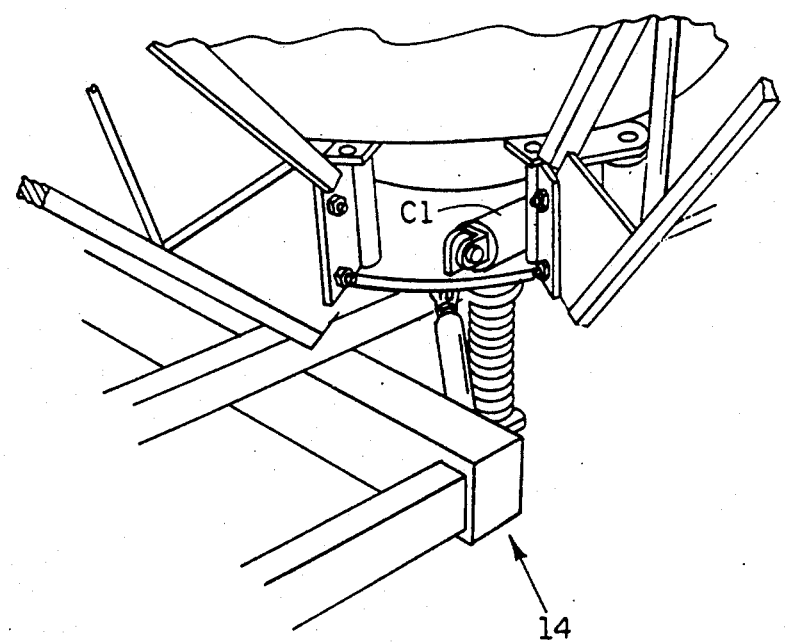
FIG. 12 is an enlarged perspective view of the cylinder that vertically pivots the forward conical segments.

After the tree has been shaken and while the dehulling, sizing and bagging operations are being completed, the nut harvester 10 is returned to the transport position and moved to the next tree for harvesting. The tree-grasping arms 230 of the shaking mechanism 200 are disengaged from the tree by cylinder E (see FIG. 7). Cylinders D1 and D2 release the forwardmost support arms 120g, 120h causing them to move horizontally towards the nut harvester chassis 12 (see FIGS. 3B, 5 and 14). Hydraulic cylinders C1 and C2 return the forward conical segments 104 and 105 to an open position disposed in generally transverse position to the chassis 12 (see FIGS. 3B, 12 and 13). The nut harvester 10 can then be backed away from the tree to cause the conical segments 102–105 to fully clear the branches. If more clearance of tree branches is required, frame 14 that supports the foldable canopy 100 and the shaking mechanism 200 can be lowered by cylinders A1 and A2 (see FIG. 6).

After the conical segments 102–105 have cleared the branches of the tree, cylinder B is contracted to cause the upper portions of the conical segments to be moved upwardly toward the self-propelled chassis 12 in a direction parallel to the path of the self-propelled chassis 12 by rotation of bushings 352a and 352b about shafts 356a and 356b respectively. (See FIGS. 5 and 10.) The nut harvester 10 is now in the transport position (see FIGS. 3A and 2) and can be moved through the grove without maneuvering problems.

What is claimed and desired to be secured by Letters Patent is:

1. The method of harvesting tree-grown nuts formed in a hull and normally droppable with the hull when ripened, comprising the steps of:

surrounding the trunk of the tree with an inverted, cone-shaped canopy having an upper perimeter at least equal to the largest perimeter of the tree, said canopy being mounted on a self-propelled chassis and being movable from a folded position to a full conical position completely surrounding the tree by hydraulic means mounted on said chassis;

providing an opening in said canopy adjacent the lower portions thereof and located between the chassis and the tree trunk;

providing trunk-engaging arms beneath the bottom portions of said canopy and shaking the tree by said trunk-engaging arms;

directing the falling nuts, hulls and trash toward said opening in said lower end of said canopy;

catching nuts, full and empty hulls and other trash dislodged by shaking the tree, on a conveyor mounted on said chassis and disposed of below said canopy opening;

drawing an air stream in contact with said conveyor by a vacuum system mounted on said chassis to remove empty hulls and other trash having a weight less than the nuts from said conveyor, thereby leaving nuts and hulls containing nuts on said conveyor;

discharging the empty hulls and other trash on the ground to provide a mulch; and passing said hulls containing nuts through a dehulling machine mounted on said chassis.

2. The method of claim 1 wherein said step of directing the falling nuts, hulls and trash toward said canopy opening is accomplished by circumferentially spaced air jets provided in the portions of said canopy remote from said canopy opening.

3. The method of claim 1 further comprising the step of sizing the dehulled nuts by a sizing mechanism mounted on said chassis.

4. The method of claim 3 further comprising the step of bagging the sized nuts by attaching bags to said sizing mechanism.

5. The method of surrounding a nut tree with an inverted generally conical fabric canopy to catch nuts dislodged from the tree by a shaking action, comprising the steps of:

forming the canopy by assemblage on a self-propelled chassis of two sets of conical segments, each set being pivotally movable about a respective horizontal axis parallel to the movement of the chassis, each conical segment having a rigid conical segment bottom portion vertically pivotally secured to an adjacent conical segment bottom portion, a plurality of radially outwardly extending rigid fabric support arms pivotally secured to said conical segment bottom portions in peripherally spaced relation, and a flexible fabric supported by said fabric support arms;

moving the canopy toward a nut tree;

pivoting each set of said fabric support arms downwardly about the respective said horizontal axis toward a less inclined position to clear the lower branches of the tree being approached;

horizontally pivoting at least the forward one of said conical segment bottom portions closest to the tree being approached relative to the other conical segment bottom portions to permit passage of the tree trunk being approached into adjacent relationship to the other conical segment bottom portions;

after reaching a position where the approached tree trunk is in said adjacent relationship to said other conical segment bottom portions, horizontally pivoting said forward conical segment bottom portions into surrounding relationship with said tree trunk and vertically pivoting said fabric support arms upwardly to form said flexible fabric into an inverted cone-shaped configuration surrounding the trunk and lower branches of the nut tree.

6. The method of harvesting tree-grown nuts formed in a hull and normally droppable from the hull when ripened comprising the steps of:

forming a flexible fabric canopy capable of assuming an inverted cone-shaped configuration surrounding the trunk and bottom portions of the nut trees to be harvested by assemblage of two sets of conical segments on the forward end of a self-propelled chassis, each set being pivotal about a horizontal axis parallel to the path of movement of the chassis, each segment of each set having a rigid conical bottom portion vertically pivotally secured to an adjacent conical segment bottom portion, a plurality of radially upwardly extending fabric support arms secured to said conical segment bottom portions in peripherally spaced relation, said flexible fabric being supported by said arms;

moving the chassis toward a nut tree to be harvested;

horizontally pivoting at least one of said forward conical segment bottom portions closest to the tree being approached relative to the other conical segment bottom portions to permit passage of the tree trunk being approached into adjacent relationship with the rearward conical segment bottom portions;

pivoting each set of said fabric support arms downwardly about the respective said horizontal axis to clear the lower branches of the tree being approached;

after reaching a position where the trunk of the tree being approached is in said adjacent relationship to said rearward conical segment bottom portions, horizontally pivoting said forward conical segment portions into surrounding relationship with said tree trunk and vertically pivoting each set of said fabric support arms upwardly to form said flexible fabric into an inverted cone-shaped configuration surrounding the trunk and lower branches of said tree;

providing an opening in said canopy adjacent the lower portions thereof and located between the chassis and the tree trunk;

providing shiftable trunk-engaging members on said chassis below the bottom portions of said canopy and shaking the tree by said trunk-engaging members, whereby nuts, hulls and trash dislodged from the tree by said shaking action will fall into said canopy;

directing the falling nuts, hulls and trash toward said opening in said lower portion of said canopy;

catching nuts, full and empty hulls and other trash entering said opening on a conveyor mounted on said chassis and having an input end disposed below said canopy opening;

drawing an air stream in contact with said conveyor by a fan mounted on said chassis to remove empty hulls and other trash having a weight less than the nuts from the conveyor, thereby leaving nuts and hulls containing nuts on said conveyor;

discharging the empty hulls and other trash on the ground to provide a mulch; and passing said hulls containing nuts through a dehulling machine mounted on said chassis.

7. The method of harvesting tree-grown nuts formed in a hull and normally droppable from the hull when ripened comprising the steps of:

forming a flexible fabric canopy capable of assuming an inverted cone-shaped configuration surrounding the trunk and lower limbs of the nut trees to be harvested by assemblage of two sets of conical segments on a forwardly projecting frame mounted on the forward end of a self-propelled chassis, each conical segment of each set having a rigid bottom portion vertically pivotally secured to an adjacent rigid bottom portion, a plurality of radially upwardly extending fabric support arms secured to each said rigid bottom portion in peripherally spaced relation, said flexible fabric being supported by said fabric support arms, and each set of said rigid bottom portions being pivotally mounted on said frame for limited movement about a respective horizontal axis parallel to the direction of movement of said chassis;

moving the chassis toward a nut tree to be harvested;

horizontally pivoting the forward rigid bottom portion of each set closest to the tree being approached relative to the other rigid bottom portions of each set to permit passage of the tree trunk being approached into surrounded relationship by said two sets of rigid bottom portions;

pivoting each set of said rigid bottom portions about the respective said horizontal axis to shift said fabric support arms downwardly to clear the lower branches of the tree being approached;

after reaching a position where the trunk of the tree being approached is in surrounded relationship by said two sets of rigid bottom portions, vertically pivoting said two sets of rigid bottom portions upwardly about the respective said horizontal axis to form said flexible fabric into an inverted cone-shaped configuration surrounding the trunk and lower branches of said tree;

providing an opening in the rearward rigid bottom portions;

providing shiftable trunk-engaging members on said frame below said rigid bottom portions of said canopy;

shaking the tree by said trunk-engaging members, whereby nuts, hulls and trash dislodged from the tree by the shaking action will fall into said canopy;

directing the falling nuts, hulls and trash into said opening; and catching nuts, full and empty hulls and other trash entering said opening onto the input end of a conveyor mounted on said chassis and having an input end disposed beneath said opening.

8. The method of claim 7 further comprising the step of moving said frame closer to the ground as said chassis approaches a tree to be harvested, thereby increasing the clearance between said canopy and the lower limbs of the tree being approached.

9. The method of claim 6 wherein said step of directing the falling nuts, hulls and trash toward said canopy opening is accomplished by circumferentially spaced air jets provided in the portions of said canopy remote from said canopy opening.

10. The method of claim 6 further comprising the steps of:
dehulling the nuts;
sizing the dehulled nuts by a sizing mechanism mounted on said chassis; and
bagging the sized nuts by attaching bags to said sizing mechanism.

11. The method of claim 5 further comprising the step of moving the foremost fabric support arms into abutment to stretch the flexible material into a closed conical configuration.

12. Apparatus for collecting nuts and hulls shaken from a nut-growing tree comprising, in combination:
a self-propelled chassis having an elevated operator's station adjacent one end of said chassis;
a nut-catching canopy;
means for mounting said canopy on said one end of said chassis in front of said operator's station;
said canopy being formed of a plurality of vertically pivotally interconnected conical segments forming in one position a transverse array across said one end of said chassis for transport, and in a second position, an inverted, generally cone-shaped configuration having a small-diameter bottom end constructed and arranged to surround the trunk of a nut tree to be harvested;
said canopy having a nonpivoted, vertically inclined wall portion positioned on said chassis between said operator's station and a tree to be harvested;
means on said chassis for engaging and shaking the nut tree to be harvested; and
at least one window mounted in said vertically inclined wall portion to provide operator visibility of the tree to be harvested during the approach of the chassis to the tree and during the nut-harvesting operation.

13. The apparatus of claim 12 wherein the bottom portion of said canopy is defined by a plurality of rigid conical segments;
two of said segments being mounted on said chassis on each side of the bottom portion of said downwardly inclined wall portion, thereby defining a discharge opening for nuts, hulls and other trash falling into said canopy as a result of the shaking of the nut tree; and
a conveyor mounted on said chassis and having an input end disposed beneath said discharge opening and an output end adjacent to a collection bin located beneath said operator's station.

14. The apparatus of claim 13 further comprising means defining a plurality of air jets in said segments directed toward said opening.

15. The apparatus of claim 14 wherein at least two of said conical segments remote from said opening have spaced double walls defining an air pressure chamber;
means for supplying pressured air to said air pressure chamber; and
nozzle means in the inner wall of said double-walled conical segments directing said pressured air toward said opening.

16. The apparatus of claim 13 wherein the two other said conical segments are respectively vertically pivotally mounted on the ends of said first two conical segments remote from said downwardly inclined wall portion for movement between a transport position generally transverse to said chassis end and a circumferentially joined position defining said inverted cone-shaped configuration constructed and arranged to encircle the nut tree to be harvested.

17. The apparatus of claim 13 further comprising a means for directing a stream of air adjacent said conveyor to remove trash and empty hulls from the conveyor and deposit same on the ground.

18. The apparatus of claim 13 further comprising:
a collection bin positioned to receive nuts and nut-filled hulls from said conveyor;
a dehulling means mounted on said chassis; and
a second conveyor constructed and arranged to transfer nuts and hulls containing nuts from said collection bin to said dehulling means.

19. The apparatus of claim 18 further comprising:
means for separating empty hulls from the nuts; and
a third conveyor onto which nuts from said separating means can be deposited for visual inspection.

20. The apparatus of claim 19 further comprising means on said chassis for sizing all dehulled nuts.

21. The apparatus of claim 20 further comprising means on said chassis for bagging the sized nuts.

22. Apparatus for collecting nuts and hulls shaken from a nut-growing tree comprising, in combination:
a self-propelled chassis having an operator's station adjacent one end of said chassis;
a nut-catching canopy;
means for mounting said canopy on said one end of said chassis in front of said operator's position;
said canopy being formed of a plurality of vertically pivotally interconnected conical segments forming in one position a transverse array across said one end of said chassis for transport, and in a second position, an inverted, generally cone-shaped configuration having a small-diameter bottom end constructed and arranged to surround the trunk of a nut tree to be harvested;

means on said chassis for engaging and shaking said trunk;

conveyor means on said chassis communicating with said bottom portion of said canopy; and air jet means on said bottom portion of said canopy for directing trash and nuts onto said conveyor, 23. Apparatus for collecting nuts and hulls shaken from a nut-growing tree comprising, in combination:

a self-propelled chassis having an operator's station adjacent one end of said chassis;

a nut-catching canopy;

means for mounting said canopy on said one end of said chassis in front of said operator's position;

said canopy being formed of a plurality of vertically pivotally interconnected conical segments forming in one position a transverse array across said one end of said chassis for transport, and in a second position, an inverted, generally cone-shaped configuration having a small-diameter bottom end constructed and arranged to surround the trunk of a nut tree to be harvested;

means on said chassis for engaging and shaking said trunk;

the bottom portion of said canopy being defined by two sets of rigid conical segments separable from a closed conical configuration by pivotal movement of the forward segments of each set about vertical axes;

a canopy support frame mounted on and projecting forwardly from said chassis;

means for vertically shifting said canopy support frame relative to the ground, thereby increasing clearance of the canopy relative to the lower tree limbs;

means for pivotally mounting each set of said rigid conical segments on said frame for respective movements about laterally spaced horizontal axes parallel to the path of movement of said chassis; and means for moving said rigid conical segments to tilt both sets of said rigid conical canopy segments downwardly in said transport position to clear the lower branches of a tree being approached by said chassis.

24. The apparatus of claim 23 further comprising means on said frame below said rigid conical segments for engaging and shaking said trunk.

25. The apparatus of claim 23 further comprising:

a plurality of radially and upwardly projecting fabric support arms pivotally secured to the periphery of each rigid conical segment for movement about vertical axes;

a flexible fabric secured to all said fabric support arms; and means for pivoting said fabric support arms rearwardly about said vertical pivot axes to fold said flexible fabric into said transport position.

26. The apparatus of claim 22 wherein said bottom portion of said canopy is defined by a plurality of rigid conical segments;

two of said rigid segments being mounted on said chassis on each side of said conveyor, and defining a discharge opening for nuts, hulls and other trash falling into said canopy as a result of the shaking of the nut tree;

a collection bin on said chassis; and said conveyor having an input end disposed beneath said discharge opening and an output end operatively associated with said collection bin.

27. The apparatus of claim 26 further comprising means defining a plurality of air jets in said conical segments directed toward said opening.

28. The apparatus of claim 27 wherein at least two of said conical segments remote from said opening have spaced double walls defining an air pressure chamber;

means for supplying pressured air to said fluid pressure chamber; and nozzle means in the inner wall of said double-walled conical segments directing said pressured air toward said opening.

29. The apparatus of claim 26 wherein the other said conical segments are respectively vertically pivotally mounted on the ends of said two conical segments remote from said downwardly inclined wall portion for movement between a transport position generally transverse to said chassis end and a circumferentially joined position defining said inverted cone-shaped configuration constructed and arranged to encircle the nut tree to be harvested.

30. The apparatus of claim 26 further comprising vacuum means for directing a stream of air adjacent said conveyor to remove trash and empty hulls from the conveyor and deposit same on the ground.

31. The apparatus of claim 26 further comprising:

a dehulling means on said chassis; and a second conveyor on said chassis with its input end communicating with said collection bin and the output end of said conveyor communicating with said dehulling means.

32. The apparatus of claim 31 further comprising:

means for separating nuts from the empty hulls; and a third conveyor onto which nuts from said separating means can be deposited for visual inspection.

33. The apparatus of claim 32 further comprising means on said chassis for sizing all dehulled nuts.

34. The apparatus of claim 33 further comprising means on said chassis for bagging the sized nuts.

35. Apparatus for collecting nuts and hulls shaken from a nut-growing tree comprising in combination:

a self-propelled chassis having an elevated operator's station adjacent one end of said chassis;

a nut-catching canopy;

means for mounting said canopy on said one end of said chassis in front of said operator's station;

said nut-catching canopy being formed of a plurality of vertically pivotally interconnected conical segments forming in one position a generally transverse array across said one end of said chassis for transport, and in a second position, an inverted, generally cone-shaped configuration having a small-diameter bottom end portion constructed and arranged to surround the trunk of a nut tree to be harvested;

said canopy having a nonpivoted, vertically inclined wall portion positioned on said chassis between said operator's station and a tree to be harvested;

at least one window in said inclined wall portion;

said canopy having a bottom portion defined by a plurality of rigid conical segments;

two of said conical segments being mounted on said chassis on each side of the bottom of said vertically inclined wall portion, thereby defining a discharge opening for nuts, hulls and other trash falling into said canopy;

two other of said conical segments being respectively vertically pivotally mounted on the ends of said first two conical segments remote from said downwardly inclined wall portion for movement between a transport position generally transverse to said chassis end and a circumferentially joined position defining said inverted cone-shaped configuration constructed and arranged to encircle the nut tree to be harvested;

said conical segments remote from said downwardly inclined wall portion having spaced double walls defining an air pressure chamber;

means on said chassis for supplying pressured air to said air pressure chamber;

nozzles in the inner wall of said double-walled conical segments directing pressured air towards said discharge opening;

means on said chassis for engaging the tree trunk and shaking the tree causing nuts, hulls and trash to fall into said canopy;

a collection bin mounted on said chassis;

a first conveyor positioned beneath said discharge opening for moving nuts, hulls and trash to said collection bin;

vacuum means for drawing an air stream in contact with said conveyor to remove empty hulls and other trash of less weight than the nuts from said conveyor, thereby leaving nuts and hulls containing nuts on said conveyor;

dehulling means mounted on said chassis;

a second conveyor on said chassis with its input end communicating with said collection bin and its output end communicating with said dehulling means;

a blower producing an air stream contacting the output of said dehulling means for separating hulls and broken nuts from the whole nuts;

said blower having a debris exhaust vent for expelling empty hulls;

said debris exhaust vent having a perforated bottom wall to permit broken nuts to fall through to be separated;

a third conveyor mounted on said chassis running horizontally with its input end beneath said dehulling means and onto which said blower deposits whole nuts;

said third conveyor having an exposed medial portion for manual removal of trash and broken nuts;

auger means having an input end communicating with said output end of said third conveyor;

a sizing means positioned above said third conveyor;

said auger means being constructed and arranged to carry whole nuts to said sizing means; and a bagging means for separately bagging the nuts separated by said sizing means.

36. Apparatus for collecting nuts and hulls shaken from a nut-growing tree comprising, in combination:
a self-propelled chassis having an operator's station;
shaking means attached to said chassis for dislodging nuts from the tree;
nut-catching means attached to said chassis positioned below and surrounding the lower branches of the tree;
nut-dehulling means attached to said chassis; and
means for conveying the nuts received in said nut-catching means to said dehulling means whereby nuts are released from the hulls; and
means for separating the nuts from the empty hulls.

37. The apparatus of claim 36 further comprising a nut-sizing means receiving said dehulled nuts and separating the nuts according to size.

38. The apparatus of claim 37 further comprising a plurality of nut-bagging means for separately bagging the separate sizes of nuts.

39. The apparatus of claim 36 wherein said nut-catching means comprises a canopy formed of a plurality of pivotally interconnected conical segments forming in one position a transverse array across forward end of said chassis for transport, and in second position, an inverted, generally cone-shaped configuration having a small-diameter bottom end portion constructed and arranged to surround the trunk of a nut tree to be harvested.

40. The apparatus of claim 39 wherein said pivotally interconnected conical segments comprises:
two sets of rigid conical segment bottom portions, pivotally connected for movement from an adjoining position encircling a tree trunk to said transport position;
a plurality of fabric support arms secured to said bottom portions in radially and upwardly projecting relation; and
a flexible fabric secured to said fabric support arms.

41. The apparatus of claim 39 wherein said canopy comprises:
a nonpivoted, vertically inclined wall portion positioned on said chassis between said operator's station and a tree to be harvested; and
at least one window in said inclined wall portion for viewing the interior of said canopy.

42. The apparatus of claim 40 further comprising means for moving the forwardmost support arms into abutting relation to stretch said flexible fabric into said inverted cone-shaped configuration.

43. In a harvester for tree-grown nuts having a self-propelled chassis, the improvement comprising a frame mountable in forwardly projecting relationship on said chassis:
a subframe:
means for mounting said subframe to said frame for reciprocal horizontal movement transverse to the direction of movement of said chassis;
a pair of tree trunk-engaging arms mounted on said subframe for horizontal movement relative to each other parallel to said horizontal movement of said subframe;
a fluid pressure cylinder for moving said arms into and out of engaging relationship with a tree trunk;
an eccentric mass mounted on said subframe for rotation about a vertical axis; and
means for rotating said eccentric mass about said vertical axis, thereby horizontally vibrating said subframe and said tree trunk-engaging arms to impart a shaking movement to a tree trunk.

44. The apparatus of claim 43 further comprising hydraulic means for raising said frame relative to said chassis for transport and lowering said frame during approach to a tree to be harvested.

45. The apparatus of claim 44 further comprising:
a segmented canopy mounted on said frame above said subframe; and
said canopy being foldable from a transport position generally transverse to the direction of travel of said chassis to an inverted cone-shaped configuration surrounding the trunk and lower branches of the tree to be harvested by shaking nuts from the tree into said canopy.

* * * * *